Ⅰ(12) United States Patent
Morisada et al.

(10) Patent No.: US 8,935,372 B2
(45) Date of Patent: Jan. 13, 2015

(54) MEDIATION SERVER, TERMINALS AND DISTRIBUTED PROCESSING METHOD

(75) Inventors: Hidehiko Morisada, Tokyo (JP); Hirotoshi Maegawa, Tokyo (JP); Koji Kageyama, Tokyo (JP); Takayuki Sakamoto, Tokyo (JP); Michinari Kohno, Tokyo (JP); Kenji Yamane, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 653 days.

(21) Appl. No.: 12/525,327

(22) PCT Filed: Feb. 2, 2007

(86) PCT No.: PCT/JP2007/000052
§ 371 (c)(1),
(2), (4) Date: Oct. 27, 2009

(87) PCT Pub. No.: WO2008/096390
PCT Pub. Date: Aug. 14, 2008

(65) Prior Publication Data
US 2010/0115521 A1      May 6, 2010

(51) Int. Cl.
*G06F 15/173*       (2006.01)
*G06F 9/50*         (2006.01)

(52) U.S. Cl.
CPC .................................... *G06F 9/5072* (2013.01)
USPC ........................................................ 709/223

(58) Field of Classification Search
USPC ...................................................... 709/223
See application file for complete search history.

(56) References Cited

U.S. PATENT DOCUMENTS 6,718,361 B1 *   4/2004   Basani et al. ................ 709/201
6,748,447 B1 *   6/2004   Basani et al. ................ 709/244
(Continued)

FOREIGN PATENT DOCUMENTS

JP       7-253952        10/1995
JP      09-146898         6/1997
(Continued)

OTHER PUBLICATIONS

Notification of Reason(s) for Refusal dated Aug. 24, 2010, from the corresponding Japanese Application.
(Continued)

*Primary Examiner* — Alicia Baturay
(74) *Attorney, Agent, or Firm* — Katten Muchin Rosenman LLP

(57) ABSTRACT

A highly convenient data processing technique is provided. A mediation server includes: a project information acquiring unit which acquires information on a project from a project server and stores the acquired information in a project database, the project server managing the project in which a computational processing is divided into a plurality of tasks so as to have the plurality of tasks processed by a plurality of terminals; a project information transmitter which presents the information on the project to a terminal and which transmits, to the terminal, information necessary for the terminal to access a project server of a project that the terminal desires to participate in; and an execution status management unit which receives a notification indicating that the terminal having accessed the project server using the information has executed a task assigned from the project server and which stores an execution status in a terminal database.

23 Claims, 8 Drawing Sheets

(56) References Cited

U.S. PATENT DOCUMENTS

| | | | |
|---|---|---|---|
| 7,346,682 B2* | 3/2008 | Basani et al. | 709/224 |
| 7,401,129 B2* | 7/2008 | Negishi et al. | 709/219 |
| 7,450,700 B2* | 11/2008 | Bennett et al. | 379/93.14 |
| 7,451,221 B2* | 11/2008 | Basani et al. | 709/226 |
| 7,454,659 B1* | 11/2008 | Gaudette et al. | 714/33 |
| 7,693,931 B2* | 4/2010 | Polan | 709/201 |
| 7,792,693 B2* | 9/2010 | Bultmeyer et al. | 705/7.26 |
| 7,810,099 B2* | 10/2010 | Dettinger et al. | 718/106 |
| 8,005,710 B2* | 8/2011 | Vishnumurty et al. | 705/7.11 |
| 8,032,635 B2* | 10/2011 | Moore | 709/226 |
| 2003/0023669 A1* | 1/2003 | DeLima et al. | 709/203 |
| 2004/0019663 A1* | 1/2004 | Viswanath et al. | 709/220 |
| 2004/0019669 A1* | 1/2004 | Viswanath et al. | 709/223 |
| 2004/0205759 A1 | 10/2004 | Oka | |
| 2005/0188087 A1 | 8/2005 | Iyoda | |
| 2006/0015475 A1* | 1/2006 | Birkner et al. | 707/1 |
| 2006/0020939 A1* | 1/2006 | Fellenstein et al. | 718/1 |
| 2006/0136917 A1* | 6/2006 | Gebhart et al. | 718/100 |
| 2007/0094023 A1* | 4/2007 | Gallino et al. | 704/251 |
| 2007/0094270 A1* | 4/2007 | Gallino et al. | 707/10 |
| 2007/0106773 A1* | 5/2007 | Gallino et al. | 709/223 |
| 2008/0162681 A1* | 7/2008 | Yellapragada et al. | 709/223 |
| 2010/0115521 A1* | 5/2010 | Morisada et al. | 718/102 |
| 2010/0287543 A1* | 11/2010 | Wehkamp | 717/171 |

FOREIGN PATENT DOCUMENTS

| | | |
|---|---|---|
| JP | 2002-269394 | 9/2002 |
| JP | 2004-062608 | 2/2004 |
| JP | 2004-287801 | 10/2004 |
| JP | 2004-362149 | 12/2004 |
| WO | 02/03203 | 1/2002 |

OTHER PUBLICATIONS

Notification of Reason(s) for Refusal dated Mar. 15, 2011, from corresponding Japanese Application No. 2007-541515.

International Preliminary Report on Patentability and Written Opinion of the International Searching Authority dated Aug. 4, 2009 from the corresponding International Application PCT/JP2007/000052.

International Search Report dated Feb. 27, 2007 from the corresponding International Application PCT/JP2007/000052.

* cited by examiner

FIG.4

| PROJECT ID 150 | PROJECT NAME 151 | PROJECT SERVER URL 152 | PROJECT CONTENTS 153 | REQUESTED DATE/TIME 154 | TIME LIMIT 155 | PROCESSOR 156 | MEMORY 157 | QUANTITY OF TASKS REQUESTED 158 | DISTRIBUTION-COMPLETED TASK QUANTITY 159 | EXECUTION-COMPLETED TASK QUANTITY 160 |
|---|---|---|---|---|---|---|---|---|---|---|
| 0001 | A | http://www.xx.xx | GENE ANALYSIS | 06/05/08 11:50:23 | 06/05/31 12:00:00 | 500MHz | 256MB | 4000 | 3200 | 1850 |
| 0002 | B | http://www.yy.yy | DECRYPTION | 06/05/10 2:47:06 | 06/06/10 09:00:00 | 1GHz | 512MB | 3000 | 1400 | 1000 |
| .. | .. | .. | .. | .. | .. | .. | .. | .. | .. | .. |

| TERMINAL ID 165 | USER ID 166 | PROCESSOR 167 | MEMORY 168 | CONDITION 185 | IN-DISTRIBUTION PROJECT ID 169 | DISTRIBUTION DATE/TIME 170 | TIME LIMIT 171 | IN-DISTRIBUTION TASK QUANTITY 172 | EXECUTION STATUS 173 | TOTAL DISTRIBUTION AMOUNT 174 | TOTAL EXECUTION AMOUNT 175 | COMPENSATION 176 |
|---|---|---|---|---|---|---|---|---|---|---|---|---|
| 0001 | A | 500MHz | 256MB | FOR ACADEMIC PURPOSES | 0001 | 06/05/03 11:50:23 | 06/05/31 12:00:00 | 200 | 100 | 1550 | 1550 | 3100 |
| 0002 | B | 1GHz | 512MB | ARBITRARY | 0002 | 06/05/10 21:47:06 | 06/06/10 09:00:00 | 300 | 180 | 1000 | 900 | 1800 |
| .. | .. | .. | .. | .. | .. | .. | .. | .. | .. | .. | .. | .. |

| 177 | 178 | 179 | 180 | 181 | 182 | 183 | 184 |
|---|---|---|---|---|---|---|---|
| HISTORY ID | TERMINAL ID | USER ID | PROJECT ID | DISTRIBU-TION DATE/TIME | TIME LIMIT | COMPLETION DATE/TIME | QUANTITY OF TASKS |
| 0001 | 0524 | X | 0002 | 06/05/06 10:42:23 | 06/05/31 12:00:00 | 06/05/07 22:04:00 | 4000 |
| 0002 | 2976 | Y | 0143 | 06/05/06 11:07:06 | 06/05/31 09:00:00 | 06/05/06 19:56:14 | 3000 |
| .. | .. | .. | .. | .. | .. | .. | .. |

146

MEDIATION SERVER, TERMINALS AND DISTRIBUTED PROCESSING METHOD

TECHNICAL FIELD

The present invention relates to a distributed processing technology and more particularly to a mediation server, which mediates between a server for managing a project and a plurality of terminals for distributing and processing tasks contained in the project, the terminals and a distributed processing method.

BACKGROUND TECHNOLOGY

Known is a distributed processing technology where a plurality of computers are linked together via a network so as to virtually construct a high-performance computer. In the conventional practice, a project, such as gene analysis and protein structure analysis, which requires a large-scale computation can only be handled by a very costly and large computer which is yet to be developed. However, the construction of a distributed processing system enables the effective utilization of unused resources and also enables executing the large computation processing at very low cost.

DISCLOSURE OF THE INVENTION

Problems to be Solved by the Invention

However, under present circumstances, there is a small fraction of users who would agree to the content of grid computing and offer their own computer resources. A majority of people are unaware of the presence of the grid computing. In recent years, although a large-scale grid computing is ready for its achievement thanks to a well-built infrastructure of networks and a significantly growing rate of computer ownership, few resources are effectively used in fact.

The present invention has been made under the foregoing circumstances, and a general purpose thereof is to provide a distributed processing technology capable of effectively utilizing resources.

Means for Solving the Problems

One embodiment of the present invention relates to a mediation server. This mediation server comprises: a project information acquiring unit which acquires information on a project from a project server and stores the acquired information in a project database, the project server managing the project in which a computational processing is divided into a plurality of tasks and the plurality of tasks are processed by a plurality of terminals; a project information transmitter which presents the information on the project to a terminal and which transmits, to the terminal, information necessary for the terminal to access a project server of a project that the terminal desires to participate in; and an execution status management unit which receives a notification indicating that the terminal having accessed the project server using the information has executed a task assigned from the project server and which stores an execution status in a terminal database.

Another embodiment of the present invention relates to a terminal. This terminal comprises: a project information acquiring unit which acquires information necessary for accessing a project server that manages a project desired to be participated in, from a mediation server that mediates between the project server and a plurality of terminals, the project server managing the project in which a computational processing is divided into a plurality of tasks and the plurality of tasks are processed by the plurality of terminals; a task acquiring unit which acquires the task by accessing the project server using the information; a task execution unit which executes the task; an execution result transmitter which transmits an execution result of the task to the project server; and an execution status notification unit which conveys to the mediation server that the task has been executed.

Optional combinations of the aforementioned constituting elements, and implementations of the invention in the form of methods, apparatuses, systems and so forth may also be practiced as additional modes of the present invention.

Effect of the Invention

According to the present invention, a distributed processing technology by which resources can be effectively utilized can be provided.

BRIEF DESCRIPTION OF THE DRAWINGS

FIG. 4 shows an example of internal data in a project database.

FIG. 5 shows an example of internal data in a terminal database.

FIG. 6 shows an example of internal data in a history database.

DESCRIPTION OF THE REFERENCE NUMERALS

10 Distributed processing system, 12 Internet, 14 Project server, 20 Internet, 24 Input/output unit, 26 Processor, 28 Local memory, 30 Processing unit, 32 Processor, 34 Local memory, 100 Mediation server, 121 Project information acquiring unit, 122 Task execution request acquiring unit, 123 Terminal information acquiring unit, 124 Project selector, 125 Project information transmitter, 126 Task distributor, 127 Task information transmitter, 128 Distribution status notification unit, 129 Execution status management unit, 130 Compensation provider, 131 Statistics information notification unit, 142 Project database, 144 Terminal database, 146 History database, 200 Terminal, 221 Terminal information transmitter, 222 Project information acquiring unit, 223 Task information acquiring unit, 224 Task acquiring unit, 226 Task execution unit, 227 Execution status notification unit, 228 Execution result transmitter, 229 Decoder, 230 Signature unit

BEST MODE FOR CARRYING OUT THE INVENTION

Figure 1:
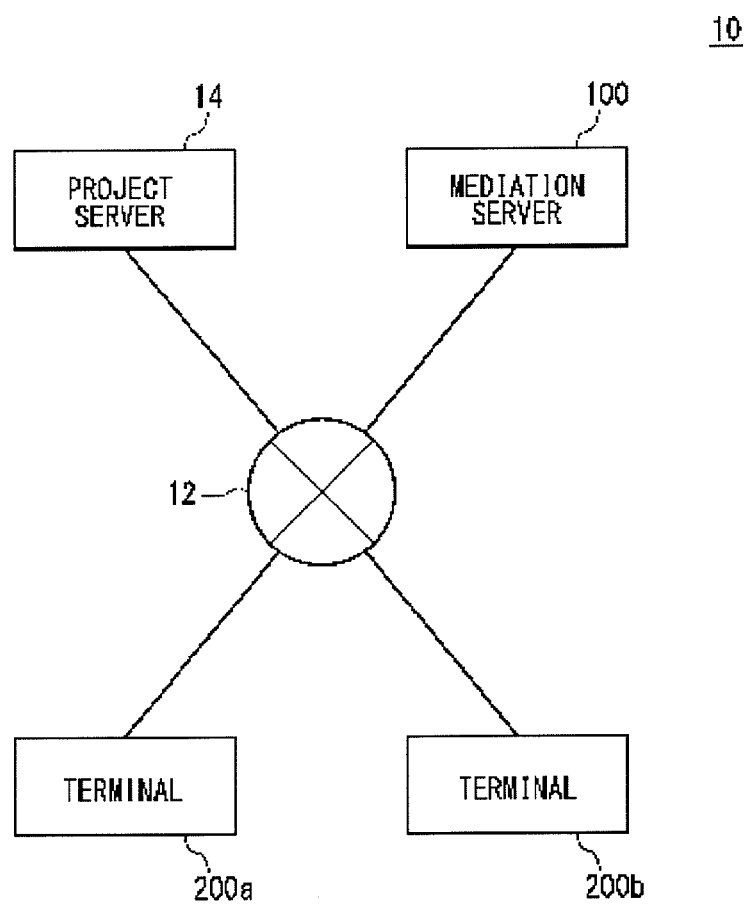
FIG. 1 shows a structure of a distributed processing system according to an embodiment.

FIG. 1 shows a structure of a distributed processing system 10 according to an embodiment. The distributed processing system 10 includes a project server 14 which manages a project involving a large-scale computation with a certain purpose, a plurality of terminals 200 which process computations included in the project in a distributed manner, and a mediation server 100 which mediates between the project server 14 and the terminals 200. These devices are connected to one other via the Internet 12 which is an example of networks.

In order that the computations included in the project can be processed by a plurality of terminals 200 in a distributed manner, executable programs and data files storing data or operational parameters used by the programs are prepared in each of processors of the terminals 200. Hereinafter, these will be called tasks. As will be described later, if a terminal 200 includes a plurality of processors, a plurality of tasks may be allocated to the terminal 200. In this case, a plurality of tasks will be called a task set. The mediation server 100 provides support for the mediation server 100 to efficiently distribute tasks, the execution of which is requested by the project server 14, to the terminals 200.

Figure 2:
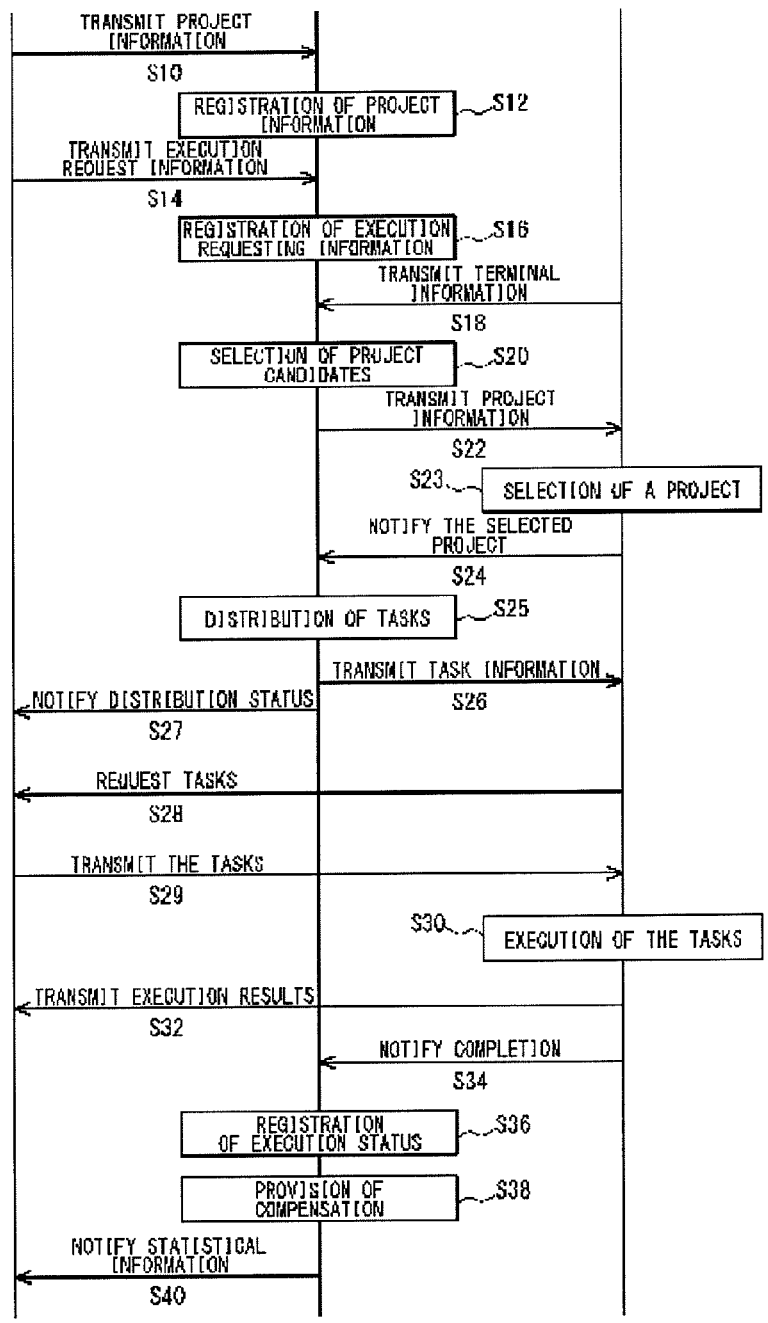
FIG. 2 is a sequence diagram schematically showing a flow of processing in a distributed processing system.

FIG. 2 is a sequence diagram schematically showing a flow of processing in the distributed processing system 10. A general flow is first described here and a detailed description of processing will be given later. The project server 14 transmits information on a project to the mediation server 100 (S10). The mediation server 100 registers the information on the project received from the project server 14, in a project database (S12). The project server 14 further transmits information on a task requested to be executed by the terminals 200, to the mediation server 100 (S14). The mediation server 100 registers execution request information received from the project server 14, in the project database (S16).

The terminals 200 transmits information on the terminals 200 to the mediation server 100 (S18). The information on the terminals 200 may include, for example, the type, clock frequency, number, or utilization rate of a processor mounted on a terminal 200, amount or remaining amount of memory, amount of tasks executable by the terminals 200 at the time, condition of a project that a user wishes to take part in, and so forth. Based on the information on the terminals received from the terminals 200, the mediation server 100 selects the candidates of projects to be introduced to the terminals 200 (S20) and transmits them to the terminals (S22). When the user of the terminal 200 selects a desired project from among the candidates presented (S23) and conveys it to the mediation server 100 (S24), the mediation server 100 determines the amount of tasks distributed to the terminals 200 (S25) and transmits information with which to access the project server 14 and information on tasks to be executed, to the terminals 200 (S26). The information with which to access the project server 14 may be a URL of the project server 14, a project ID and the like. The mediation server 100 informs the project server 14 of the fact that the tasks have been distributed to the terminals 200 (S27).

The terminal 200 accesses the project server 14 based on the information received from the mediation server 100 and requests the downloading of a task to be executed (S28). The project server 14 selects tasks executed by the terminals 200 and encrypts them so as to be sent to the terminals 200 (S29). The terminals 200 decode the tasks acquired from the project server 14 and executes them (S30). If, among the tasks to be executed by the terminals 200, programs are the same as those which the terminals 200 have already obtained from the project server 14 and data and/or parameters differ therefrom, the project server 14 may not transmit the programs to the terminals 200 but transmit the data and/or parameters only to the terminals 200. When the terminals 200 have completed the execution of tasks, the terminals 200 appends their signatures to the execution results and transmit them to the project server 14 (S32) and, conveys the fact that the executions have been completed, to the mediation server 100 (S34).

The mediation server 100 registers the execution status of tasks by the terminals 200 in the terminal databases (S36). The mediation server 100 gives a compensation to the user according to the amount of tasks executed by the terminal 200 (S38). For reference used for execution plans of a project in the project server 14, statistical information, such as a distribution status of tasks to the terminals 200 or an execution status of tasks by the terminals 200, is conveyed to the project server 14 (S40).

In this manner, the mediation server 100 mediates interaction between the project server 14 and the terminals 200 and thereby efficiently utilizes resources not in use, so that it can facilitate the project. Since the mediation server 100 introduces the information on the project to the terminals 200, the users of the terminals 200 can be widely notified of the information on the project and therefore the participation in the project can be facilitated. The mediation server 100 according to the present embodiment does not mediate the transmission and reception of data such as tasks or execution results, so that traffic increase or congestion can be suppressed.

Figure 3:
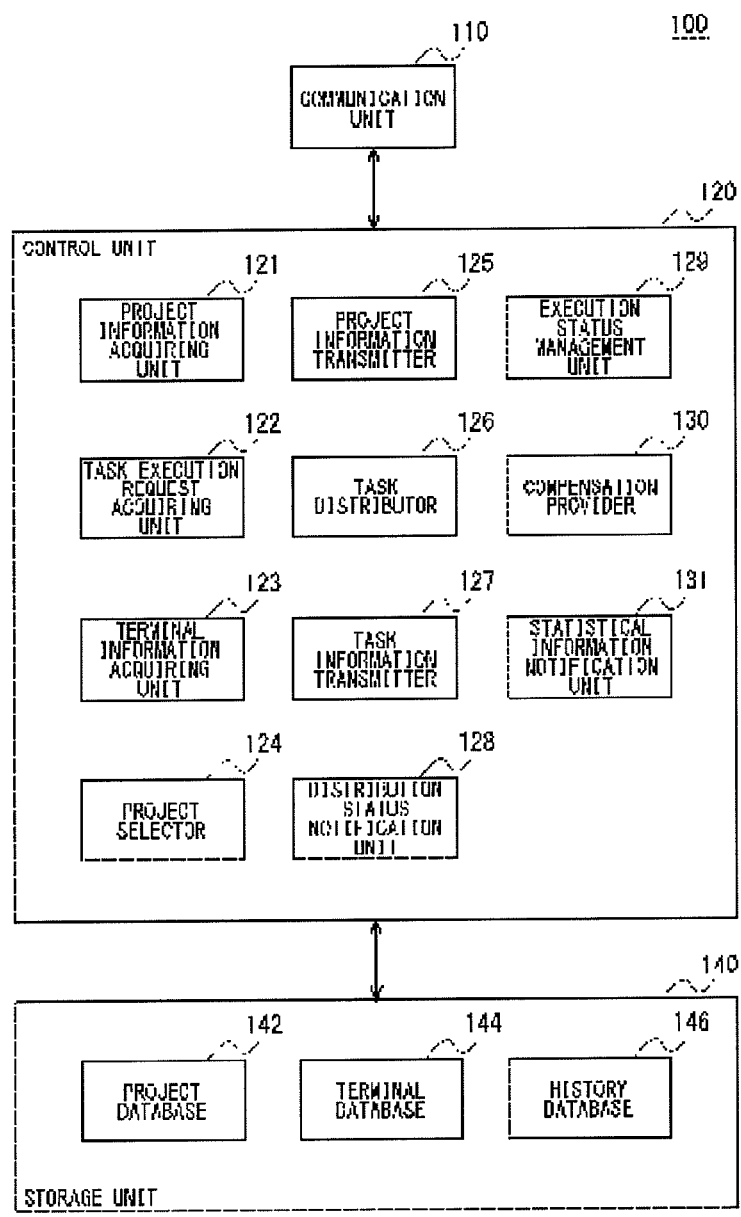
FIG. 3 shows a structure of a mediation server according to an embodiment.

FIG. 3 illustrates a structure of the mediation server 100 according to the present embodiment. The mediation server 100 is comprised of a communication unit 110, a control unit 120, and a storage unit 140. The communication unit 110 controls communications with other apparatuses connected via a network. The control unit 120 includes a project information acquiring unit 121, a task execution request acquiring unit 122, a terminal information acquiring unit 123, a projection selector 124, a project information transmitter 125, a task distributor 126, a task information transmitter 127, a distribution status notification unit 128, an execution status management unit 129, a compensation provider 130, and a statistical information notification unit 131. The storage unit 140 contains a project database 142, a terminal database 144, and a history database 146.

In terms of hardware components, these structures can be realized by a CPU and a memory of an arbitrary computer, a memory-loaded program and the like, but drawn herein are function blocks that are realized in cooperation with those. Thus, it is understood by those skilled in the art that these function blocks can be realized in a variety of forms such as by hardware only, software only or the combination thereof.

The project database 142 stores information on projects managed by the project server 14. FIG. 4 shows an example of internal data in the project database 142. Provided in the project database 142 are an project ID column 150, a project name column 151, a project server URL column 152, a project contents column 153, a request date/time column 154, a time limit column 155, a processor column 156, a memory column 157, a requested task quantity column 158, a distribution-completed task quantity column 159, and an execution-completed task quantity column 160.

The project ID column 150 stores project IDs managed by the project server 14. The project name column 151 stores the names of projects. The project server URL column 152 stores URLs used when the terminals 200 access the project server 14. The project contents column 153 stores information on the project contents. The request date/time column 154 stores dates and times when the project server 14 sent task execution requests to the mediation server 100. The time limit column 155 stores time limits within which the execution of the tasks that the project server 14 has requested of the mediation server 100 is to be completed. The processor column 156 stores conditions of processors required for the terminals 200 executing the tasks included in the project. The memory column 157 stores conditions on memories of the terminals 200. The requested task quantity column 158 stores the quantity of tasks that the project server 14 has required of the mediation server 100. The distribution-completed task quantity column 159 stores the quantity of tasks, which the mediation server 100 has distributed to the terminals 200, among those which the project server 14 has required of the mediation server 100. The execution-completed task quantity column 160 stores the quantity of tasks, the execution of which the terminals 200 have completed, among those which the mediation server 100 has distributed to the terminals 200. The quantity of tasks may be indicated by the amount of program codes, file size or the like. It may also be indicated by time required for the execution thereof.

The terminal database 144 stores information on the terminal 200 that distributes the project and processes it. FIG. 5 shows an example of internal data in the terminal database 144. Provided in the terminal database 144 are a terminal ID column 165, a user ID column 166, a processor column 167, a memory column 168, a condition column 185, an in-distribution project column 169, a distribution date/time column 170, a time limit column 171, an in-distribution task quantity column 172, an execution status column 173, a total distribution amount column 174, a total execution amount column 175, and a compensation column 176.

The terminal ID column 165 stores the IDs of the terminals 200. The user ID column 166 stores the user IDs of the terminals 200. The processor column 167 stores information such as the type or the clock frequency of a processor mounted on a terminal 200. The memory column 168 stores information such as an amount of memory mounted on a terminal 200. The condition column 185 stores a condition of a project that the user wishes to take part in. The in-distribution project ID column 169 stores the project IDs of tasks which are currently distributed to the terminals 200. The distribution date/time column 170 stores dates and times when the tasks were distributed to the terminals 200. The time limit column 171 stores the time limits of tasks distributed to the terminals 200. The in-distribution task quantity column 172 stores the quantity of tasks distributed to the terminals 200. The execution status column 173 stores information on the execution status of tasks distributed to the terminals 200. The information on the execution status may be, for example, the quantity of tasks, which have already been completed, and so forth. The total distribution amount column 174 stores the total quantity of tasks which have been distributed to the terminals 200. The total execution amount column 175 stores the total quantity of tasks executed by the terminals 200. The compensation column 176 stores the compensations provided to the users for the execution of the tasks.

The history database 146 stores information on the history of tasks distributed to the terminals 200. FIG. 6 shows an example of internal data in the history database 146. Provided in the history database 146 are a history ID column 177, a terminal ID column 178, a user ID column 179, a project ID column 180, a distribution date/time column 181, a time limit column 182, a completion date/time column, and a task quantity column 184. The history ID column 177 stores IDs of history information. The terminal ID column 178 stores IDs of terminals 200 to which the tasks have been distributed. The user ID column 179 stores the user IDs of the terminals 200. The project ID column 180 stores the project ID of tasks distributed to the terminals 200. The distribution date/time column 181 stores dates and times when the tasks were distributed to the terminals 200. The time limit column 182 stores the time limits of tasks distributed to the terminals 200. The completion date/time column 183 stores dates and times when the terminals 200 have completed the tasks. The task quantity column 184 stores the quantity of tasks executed by the terminals 200.

The project information acquiring unit 121 acquires information on projects from the project server 14 via the Internet 20. The information on projects may include project names, URLs, purposes of projects, sentences, images, moving images or the like for explaining the contents thereof, and so forth. When the project information acquiring unit 121 receives the information on a project from the project server 14, it registers the received information in the project database 142.

The task execution request acquiring unit 122 acquires an execution request of tasks from the project server 14 via the Internet 20. At this time, the task execution request acquiring unit 122 acquires information that includes the quantity and time limit of tasks to be executed, conditions on processors and memories and the like required for the execution, and registers it in the project database 142.

The terminal information acquiring unit 123 acquires information on the terminals 200 from the terminals 200 via the Internet 20. The information on the terminals 200 may include the user IDs of the terminals 200 and information on the processors, memories or the like mounted thereon. When the terminal information acquiring unit 43 receives the information on the terminals 200 from the terminals 200, it registers the received information in the terminal database 144.

When the terminals 200 participate in a project and are going to execute the tasks, the terminal information acquiring unit 123 receives conditions on the project that the users of the terminals 200 desire to participate in and information on resources on the terminals 200. The information on resources of the terminals 200 may include the utilization rates of processors, free space of memory and so forth. When the user of a terminal 200 is thinking of taking part in a project, the user may access the mediation server 100. Or the terminal 200 may be provided with a structure such that when the resource has an unused space and there is a room for the execution of a task, access is automatically made to the mediation server 100. Or the terminal 200 may be provided with a structure such that information on the resource is automatically sent to the mediation server at a predetermined timing.

Based on the information on the terminals 200 acquired by the terminal information acquiring unit 43, the project selector 124 selects the candidates of projects to be introduced to the terminals 200 by referring to the project database 142. The project selector 124 selects a project that agrees with the condition of a project desired to be participated in by referring to the project contents column 153 of the project database 142. The project selector 124 reads out the conditions on a processor and memory required for the execution of a task from the processor column 156 and the memory column 157 of the selected project, and checks if the terminal 200 meets the condition by referring to the information acquired from the processor column 167 and the memory column 168 of the terminal database 144 and the terminals 200.

The project information transmitter 125 presents information on the candidates of projects selected by the project selector 124, to the terminals 200 and inquires of the terminals 200 about any of which projects they are to participate in. When the project information transmitter 125 receives a project that the terminals 200 desire to participate in, it transmits information necessary for the terminals 200 to access, such as the URL of the project server 14 and the project ID, to the terminals 200.

When the task distributor 126 receives the decision about a project to be participated in, it determines the quantity of tasks distributed to the terminals 200. The task distributor 126 first checks the remaining quantity of tasks requested from the project server 14 by referring to the project database 142. Then, based on the information on the unused resources of the terminals 200 acquired from the terminals 200, the task distributor 126 determines the quantity of tasks distributed to the terminals 200 within a range that does not exceed the remaining quantity of tasks. The task distributor 126 checks the execution rate by referring to the total distribution amount column 174 and the total execution amount column 175 of the terminal database 144, and may restrict the quantity of tasks distributed to a terminal 200 whose execution rate is low. If the execution of tasks which have already been distributed to a terminal 200 has not yet been completed, the task distributor 126 may stop the distribution of tasks to said terminal 200. When the task distributor 126 determines the quantity of tasks distributed to the terminals 200, it adds up the distributed quantity of tasks in the distribution-completed task quantity column 159 of the project database 142 and, at the same time, registers the information in the in-distribution project ID column 169, the distribution date/time column 170, the time limit column 171 and the in-distribution task quantity column 172.

The task distributor 126 may manage the terminals having the similar type of processing circuits or storages, as a group. Thereby, the amount of resources required for the execution of tasks, time taken for the execution of tasks and the like can be estimated easily and accurately, so that the tasks can be distributed efficiently. As will be described later, if all of the terminals 200 to which the mediation server 100 distributes the tasks have the same hardware configuration, the time taken for the execution of tasks and the like can further easily and accurately be estimated and therefore the tasks can be distributed with accuracy.

The task information transmitter 127 transmits the quantity of tasks that the terminals 200 are to execute, to the terminals 200. The quantity of tasks may be expressed as time required to execute tasks or the amount of processing circuits or storages. The distribution status notification unit 128 conveys to the project server 14 the fact that the tasks have been distributed to the terminals 200. At this time, it may notify the quantity of tasks distributed to the terminals 200. If the mediation server 100 does not distribute the tasks and leaves it to the project server 14, the task distributor 126 and the information transmitter 127 may not be provided at all.

The execution status management unit 129 receives the execution status of tasks from the terminals 200 which have accessed the project server 14, using the information that the project information transmitter 125 has sent to the terminals 200. The execution status management unit 129 checks the execution status of unfinished tasks whose time limit is about to expire, by referring to the terminal database 144, and redistributes the tasks to the other terminals 200 if necessary. When the execution status management unit 129 receives from the terminals 200 a request indicating the redistribution of tasks to the other terminals 200, it redistributes the tasks, which had been distributed but has not been finished, to the other terminals. When the execution status management unit 129 receives from a terminal 200 the notification indicating that a task has been completed, it adds up the quantity of the completed task in the execution-completed task quantity column 160 of the project database 142, and initializes the in-distribution project ID column 169, distribution date/time column 170, time limit column 171, in-distribution task quantity column 172 and the execution status column 173 of the terminal database 144 so as to sum up the quantity of completed tasks in the total execution amount column 175. A new record is added to the history database 164, and information on the completed tasks is registered.

The compensation provider 130 acquired the quantity of executed tasks from the terminals 200 and provides compensation for the execution of the tasks, based on the quantity of tasks. The quantity of tasks may be expressed as time taken for the execution of tasks or the amount of processing circuits or storage units. The compensation provider 130 calculates the compensations to be given to the users, based on the quantity of tasks executed by the terminals 200, and adds them to the compensation column 176 of the terminal database 144.

The statistical information notification unit 131 conveys the information, on the status of execution by the terminals, which is acquired by the execution status management unit 129 and stored in the history database 146, to the project server 14. Thereby, the manager of a project can grasp the distribution status and execution status of tasks, which can help design a project plan and the like.

Figure 7:
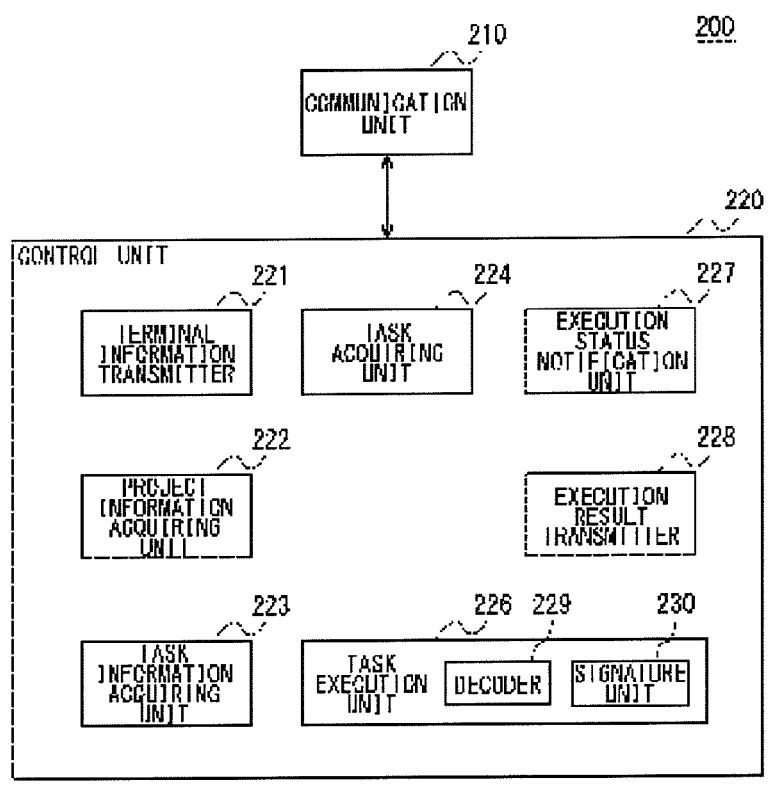
FIG. 7 shows a structure of a terminal according to an embodiment.

FIG. 7 illustrates a structure of a terminal 200 according to an embodiment. The terminal 200 is comprised of a communication unit 210 and a control unit 220. The communication unit 210 controls communications between the terminal 200 and the other terminals via a network. The control unit 220 includes a terminal information transmitter 221, a project information acquiring unit 222, a task information acquiring unit 223, a task acquiring unit 224, a task execution unit 226, an execution status notification unit 227, and an execution result transmitter 228. These structures can be realized in a variety of forms such as by hardware only, software only or the combination thereof.

The terminal information transmitter 221 transmits the information on terminals 200 to the mediation server 100. As described above, the information on terminals 200 may include the user IDs of the terminals 200, information on processors, memories or the like mounted thereon, the utilization rates of processors, free space of memory and so forth. When the user of a terminal 200 intends to participate in a project, the terminal information transmitter 221 may transmit the terminal information to the mediation server 100. Or the terminal information transmitter 221 may automatically transmit the terminal information when the resource of its own terminal 200 has an unused space and there is a room for the execution of a task. Or the terminal information transmitter 221 may automatically transmit the terminal information at a predetermined timing.

The project information acquiring unit 222 receives the candidates of projects presented from the mediation server 100 and acquires information with which to access the project server 14 of the project that the user has selected from among the candidates.

The task information acquiring unit 223 acquires information on tasks distributed from the mediation server 100. The information on tasks may include the time limits within which the execution of the tasks is to be completed, the quantity of tasks, the amount of processing circuits to be used for the execution of the tasks and so forth.

The task acquiring unit 224 accesses the project server 14 using the information acquired by the project information acquiring unit 222 so as to acquire encrypted tasks. When the project information acquiring unit 222 acquires a project ID from the mediation server 100, the task acquiring unit 224 may access the project server 14 by executing a program by which to participate in the project corresponding to the acquired project ID. This program may be downloaded from a not-shown download server. In such a case, the URL of the project server 14 is contained in the downloaded program.

When the project information acquiring unit 222 acquires the URL of the project server 14 from the mediation server 100, the task acquiring unit 224 acquires the tasks by accessing the acquired URL. The tasks may be encrypted using a public key encryption or common key encryption. That is, what is required here is that tasks are encrypted so that any third party cannot decrypt them. Unauthorized duplication of a task may be restricted using methods other than the encryption.

The task execution unit 226 executes the tasks acquired by the task acquiring unit 224. The task execution unit 226 includes a decoder 229 and a signature unit 230. The decoder 229 decodes the encrypted tasks which have been acquired by the task acquiring unit 224. If the tasks are encrypted using a public key, the decoder 229 will decode them using a secret key stored in secret in the terminals 200. If the tasks are encrypted using a common key, the decoder 229 will decode them using the common key acquired in secrecy from the project server 14. As a result, the third parties' attempt to acquire and execute the tasks to obtain information on a project is prevented, so that the interests of the manager of a project can be protected.

The signature unit 230 attaches the signature of the terminal 200 to the execution results of the tasks. Electronic signature may be attached to the execution results by encrypting the execution results using the secret key of the terminal 200. This can verify the execution results by the terminals 200 to which the tasks have been distributed. As a result, the transmission of unauthorized execution results to the project server 14 by a third party pretending to be a terminal 200 can be prevented and thus the interests of the manager of a project can be protected.

The execution status notification unit 227 conveys the execution status of tasks to the mediation server 100. The execution status notification unit 227 may notify the mediation server 100 of the execution status of tasks periodically at predetermined time intervals or it may notify the mediation server 100 of the execution status when the tasks have been completed up to a predetermined ratio. If it is determined based on the remaining quantity of tasks, memory usage and the like that the tasks cannot be completed by the time limit within which the execution of the tasks is to be completed, the execution status notification unit 227 may request the mediation server 100 to redistribute the tasks. When the execution of tasks has been completed, the execution status notification unit 227 informs the mediation server 100 of the fact that the execution thereof has been completed. The execution result transmitter 228 transmits the execution results of tasks to the project server 14.

Figure 8:
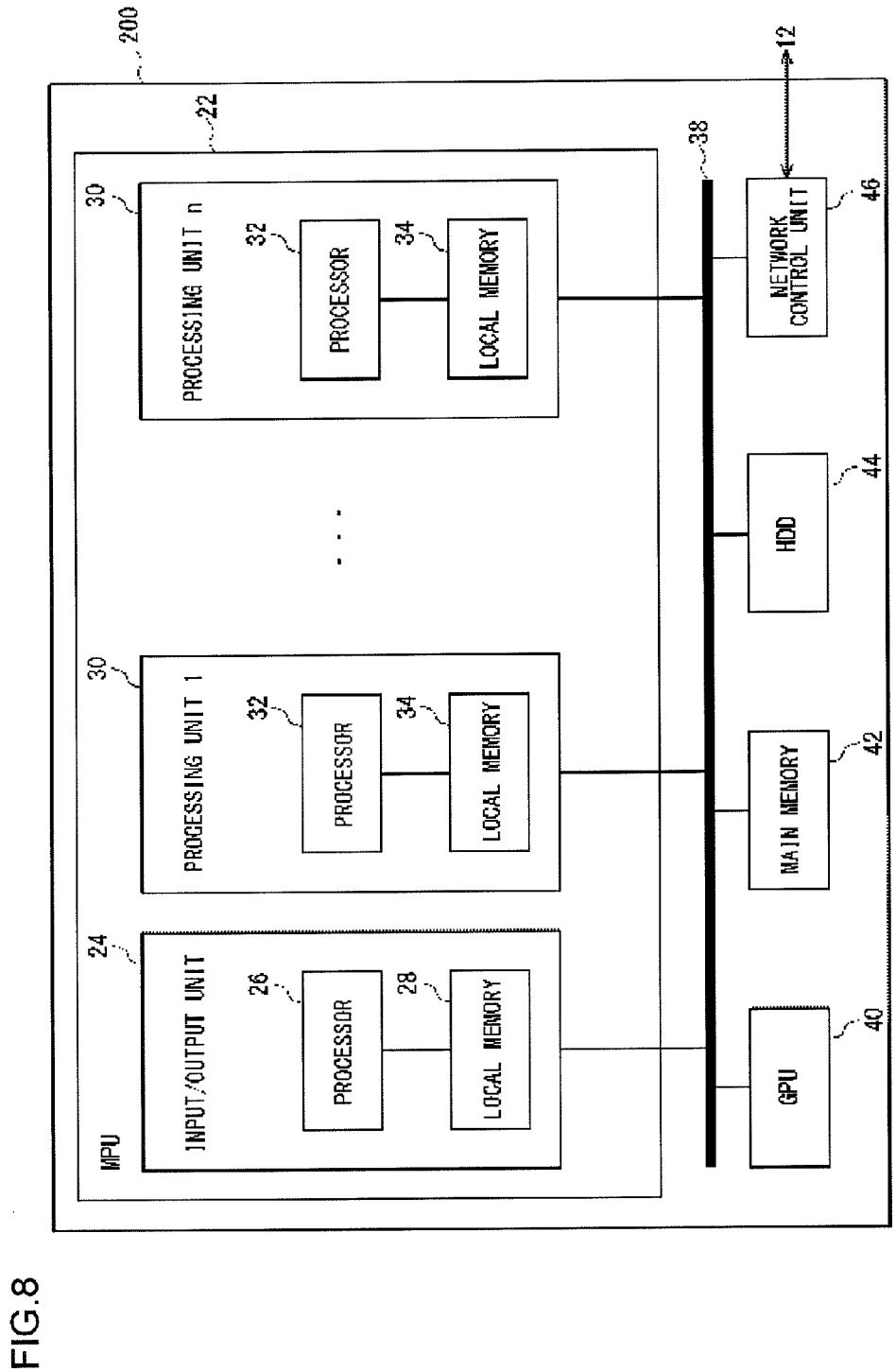
FIG. 8 shows a hardware structure of a terminal.

FIG. 8 shows a hardware structure of a terminal 200. The terminal 200 includes a microprocessor unit (MPU) 22, a graphics processing unit (GPU) 40, a main memory 42, an auxiliary storage device (HDD) 44, and a network control unit 46. The respective components are connected via a main bus 38. The network control unit 46 transmits and receives data to and from other devices via a network.

The MPU 22 is an asymmetric multiprocessor unit and it has an input/output unit 24 which is an example of a management unit and a plurality of processing units 30 which are an example of a processing unit. The input/output unit 24 is a unit which inputs and outputs data from and to other structures, and it includes a processor 26 and a local memory 28. The local memory 28 is a cache memory, for instance. Each of the processing units 30 is a unit which executes a task independently, and each of them includes a processor 32 and a local memory 34. A program, data, operation parameters and the like read out from the main memory 42 are written to the local memory 34 and are executed by the processor 32.

The input/output unit 24 transmits and receives data to and from the other structural components in the terminal 200 such as the GPU 40, the main memory 42, the HDD 44 and the network control unit 46 via the main bus 38. It also transmits and receives data to and from other devices via the network control unit 46. Although in the present embodiment the processing unit 30 can directly transmit and receive data to and from the other processing units 30, the input/output unit 24, the GPU 40 and the main memory 42, it cannot directly transmit and receive data to and from the other devices via the network control unit 46. The processing unit 30 transmits and receives data to and from the other devices via the input/output unit 24.

In another embodiment, a structure may be such that the processing unit 30 directly transmits and receives data to and from the other devices. Also, the MPU 22 may be a symmetric multiprocessor unit. In such a case, any of the processing units 30 may carry out a function of the input/output unit 24. Or all of the processing units 30 may directly transmit and receive data to and from the other devices.

The tasks distributed to the terminals 200 are executed by at least part of a plurality of processing units 30, under control of a process management function executed in the input/output unit 24. The input/output unit 24 selects processing units 30, which are not in use, from among a plurality of processing units 30 and has them execute the tasks.

The input/output unit 24 has the processing units 30 execute the tasks wherein the amount of processing units 30 is specified to the task information acquiring unit 223 from the mediation server 100. Suppose, for example, that it is specified from the mediation server 100 that three processing units 30 are to be used and that the task acquiring unit 224 has acquired a task set including three tasks which are designed on the assumption that each task can be processed by one processing unit 30. Then, the input/output unit 24 instructs three processing units 30 to execute the respective tasks. The input/output unit 24 may select processing units 30 that execute the tasks, based on the time limit of the tasks that the task information acquiring unit 223 has acquired from the mediation server 100 and the usage of a plurality of processing units 30. For example, if the task set including three tasks is acquired and there is some time to spare till the time limit, the number of processing units 30 in use simultaneously may be reduced and a free space may be created in a manner that the three tasks are executed in series by a single processing unit 30. If there is not much time left till the time limit, the three tasks may be executed in parallel by three processing units 30.

The process management function may be executed by the respective processing units 30. In such a case, tasks contained in the task set are added to a task cue provided by the use of part of the main memory 42. And when said processing unit 30 becomes capable of executing other tasks, a process management function in each processing unit 30 acquires a task awaiting execution from the task cue and then executes it. In this manner, the tasks are executed by the processing units 30. Thus the tasks given to the terminals 200 from the project server 14 are preferably designed as a program processed by the processing units 30.

The task execution unit 226 may have a function of storing a partial result when the processing unit 30 suspends the execution of a task and reading out the thus stored partial result when the execution of a task is resumed. For example, even in such a case where another process having a higher degree of priority needs to be executed, the execution of a task is suspended and will be resumed later. Thus the tasks can be switched without wasting the calculation done so far and the resources of the processing units 30 can be flexibly and effectively utilized.

In this manner, the chance for the terminals 200 to participate in a project can be increased by the mediation server 100 informing the terminals 200 of a project. As a result, the execution of the project can be accelerated.

The present invention has been described based on the exemplary embodiments. These embodiments are merely exemplary, and it is understood by those skilled in the art that various modifications to the combination of each component and each process thereof are possible and that such modifications are also within the scope of the present invention.

INDUSTRIAL APPLICABILITY

The present invention can be used for a distributed processing system.

What is claimed is:

1. A mediation server, comprising:
    a project information acquiring unit which acquires information on a project from a project server and stores the acquired information in a project database, the project server managing the project in which a computational processing is divided into a plurality of tasks and the plurality of tasks are processed by a plurality of terminals;
    a project information transmitter which presents the information on the project to a terminal and which transmits, to the terminal, information necessary for the terminal to access a project server of a project that the terminal desires to participate in; and
    an execution status management unit which receives a notification indicating that the terminal having accessed the project server using the information has executed a task assigned from the project server and which stores an execution status in a terminal database,
    wherein the mediation server is located remotely from the project server,
    wherein the mediation server mediates between the project server and the terminals that choose to participate in the project managed by the project server,
    wherein the mediation server does not mediate transmission and reception of data or execution result of the tasks, and
    wherein the project server sends tasks directly to the terminals that choose to participate in the project managed by the project server without passing the tasks through the mediation server.

2. A mediation server according to claim 1, further comprising:
    a project selector which acquires, from the terminal, a condition on a project that the terminal desires to participate in and which selects a project agreeing with the condition by referring to the project database.

3. A mediation server according to claim 1, further comprising:
    a task execution request acquiring unit which acquires an execution request of the task from the project server;
    a terminal information acquiring unit which acquires information on the terminal from the terminal; and
    a distributor which distributes the tasks, the execution of which has been requested, to the terminals, based on information on the tasks and information on the terminals.

4. A mediation server according to claim 3, wherein the distributor manages terminals having a similar type of processing circuits or storages as a group.

5. A mediation server according to claim 3, further comprising a task information transmitter which transmits time or an amount of a processing circuit or a storage required to execute the task, to the terminal.

6. A mediation server according to claim 3, further comprising a distribution status notification unit which conveys a status of task distribution by the distributor to the project server.

7. A mediation server according to claim 1, further comprising a compensation provider which acquires time or an amount of a processing circuit or a storage required to execute the task, from the terminal and which provides compensations for the execution of the task, to user of the terminal, based on the acquired time or the amount of the processing circuit or the storage.

8. A mediation server according to claim 1, further comprising a statistical information notification unit which conveys statistical information, on the execution status by the terminal, acquired by the execution status management unit to the project server.

9. A distribution processing method executed by a mediation server that is remotely located from a project server, the method comprising:
    acquiring information on a project from a project server and storing the acquired information in a project database, the project server managing the project in which a computational processing is divided into a plurality of tasks and the plurality of tasks are processed by a plurality of terminals;
    presenting the information on the project to a terminal and transmitting, to the terminal, information necessary for the terminal to access a project server of a project that the terminal desires to participate in,
    wherein the mediation server mediates between the project server and the terminal, and
    wherein the terminal can choose whether or not to participate in the project managed by the project server,
    wherein the mediation server does not mediate transmission and reception of data or execution result of the tasks, and
    wherein the project server sends tasks directly to the terminal that choose to participate in the project managed by the project server without passing the tasks through the mediation server; and
    receiving a notification indicating that the terminal having accessed the project server using the information has executed a task assigned from the project server and storing an execution status in a terminal database.

10. A computer program product embedded on a non-transitory computer-readable recording medium, executed by a mediation server that is remotely located from a project server, the program product comprising:
    a module which acquires information on a project from a project server and stores the acquired information in a project database, the project server managing the project in which a computational processing is divided into a plurality of tasks and the plurality of tasks are processed by a plurality of terminals;
    a module which presents the information on the project to a terminal and transmits, to the terminal, information necessary for the terminal to access a project server of a project that the terminal desires to participate in,
    wherein the mediation server mediates between the project server and the terminal, wherein the terminal can choose whether or not to participate in the project managed by the project server, wherein the mediation server does not mediate transmission and reception of data or execution result of the tasks, and wherein the project server sends tasks directly to the terminals that choose to participate in the project managed by the project server without passing the tasks through the mediation server; and a module which receives a notification indicating that the terminal having accessed the project server using the information has executed a task assigned from the project server and stores an execution status in a terminal database.

11. A non-transitory computer readable recording medium having embodied a programs executed by a mediation server that is remotely located from a project server, that functions as:

means for acquiring information on a project from a project server and storing the acquired information in a project database, the project server managing the project in which a computational processing is divided into a plurality of tasks and the plurality of tasks are processed by a plurality of terminals;

means for presenting the information on the project to a terminal and transmitting, to the terminal, information necessary for the terminal to access a project server of a project that the terminal desires to participate in, wherein the mediation server mediates between the project server and the terminal, wherein the terminal can choose whether or not to participate in the project managed by the project server, wherein the mediation server does not mediate transmission and reception of data or execution result of the tasks, and wherein the project server sends tasks directly to the terminal that chooses to participate in the project managed by the project server without passing the tasks through the mediation server; and means for receiving a notification indicating that the terminal having accessed the project server using the information has executed a task assigned from the project server and storing an execution status in a terminal database.

12. A terminal, comprising:

a project information acquiring unit which acquires information necessary for accessing a project server that manages a project desired to be participated in, from a mediation server that mediates between the project server and a plurality of terminals, the project server managing the project in which a computational processing is divided into a plurality of tasks and the plurality of tasks are processed by the plurality of terminals, wherein the mediation server mediates between the project server and the terminal, wherein the terminal can choose whether or not to participate in the project managed by the project server, wherein the mediation server does not mediate transmission and reception of data or execution result of the tasks, and wherein the project server sends tasks directly to the terminal that chooses to participate in the project managed by the project server without passing the tasks through the mediation server;

a task acquiring unit which acquires the task by accessing the project server using the information;

a task execution unit which executes the task;

an execution result transmitter which transmits an execution result of the task to the project server, and an execution status notification unit which conveys to the mediation server that the task has been executed, wherein the mediation server is located remotely from the project server.

13. A terminal according to claim 12, wherein the task execution unit includes a management unit and a plurality of processors, and wherein at least part of the plurality of processors executes the task under control of the management unit.

14. A terminal according to claim 13, where the tasks are designed as programs to be processed by the processing units.

15. A terminal according to claim 13, wherein the management unit executes the tasks by selecting processing units, from among the plurality of processing units, which are not in use.

16. A terminal according to claim 13, further comprising a task information acquiring unit which acquires a time limit within which the execution of the task is to be completed, from the mediation server or the project server, wherein the management unit selects the processing unit by which the task is executed, based on the time limit and usage status of the plurality of processing units.

17. A terminal according to claim 13, further comprising a task information acquiring unit which acquires specification of an amount of processing circuit to be used for the execution of the task, wherein the management unit has the processing unit of the specified amount execute the task.

18. A terminal according to claim 12, wherein the task execution unit stores a partial result when the processing unit suspends the execution of a task and reads out the stored partial result when the execution of the task is resumed.

19. A terminal according to claim 12, wherein the task acquiring unit acquires an execution program of the task encrypted by the project server, and wherein the task execution unit includes a decoder which decodes the encrypted execution program.

20. A terminal according to claim 12, wherein the task execution unit includes a signature unit which attaches a signature to an execution result of the task, wherein the execution result transmitter transmits the execution result to which the signature has been attached, to the project server.

21. A distribution processing method, comprising:

acquiring information necessary for accessing a project server that manages a project desired to be participated in, from a mediation server that mediates between the project server and a plurality of terminals, the project server managing the project in which a computational processing is divided into a plurality of tasks and the plurality of tasks are processed by the plurality of terminals;

acquiring the task by accessing the project server using the information;

executing the task;

transmitting an execution result of the task to the project server, and conveying to the mediation server that the task has been executed, wherein the mediation server is located remotely from the project server, wherein each of the terminals can choose whether or not to participate in the project managed by the project server, wherein the mediation server does not mediate transmission and reception of data or execution result of the tasks, and wherein the project server sends tasks directly to the terminals that choose to participate in the project managed by the project server without passing the tasks through the mediation server.

22. A computer program product stored on a non-transitory computer-readable medium comprising:
- a module which acquires information necessary for accessing a project server that manages a project desired to be participated in, from a mediation server that mediates between the project server and a plurality of terminals, the project server managing the project in which a computational processing is divided into a plurality of tasks and the plurality of tasks are processed by the plurality of terminals;
- a module which acquires the task by accessing the project server using the information;
- a module which executes the task;
- a module which transmits an execution result of the task to the project server; and
- a module which conveys to the mediation server that the task has been executed,
- wherein the mediation server is located remotely from the project server,
- wherein each of the terminals can choose whether or not to participate in the project managed by the project server,
- wherein the mediation server does not mediate transmission and reception of data or execution result of the tasks, and
- wherein the project server sends tasks directly to the terminals that choose to participate in the project managed by the project server without passing the tasks through the mediation server.

23. A non-transitory computer-readable recording medium having embodied a programs that functions as:
- means for acquiring information necessary for accessing a project server that manages a project desired to be participated in, from a mediation server that mediates between the project server and a plurality of terminals, the project server managing the project in which a computational processing is divided into a plurality of tasks and the plurality of tasks are processed by the plurality of terminals;
- means for acquiring the task by accessing the project server using the information; means for executing the task;
- means for transmitting an execution result of the task to the project server, and
- means for conveying to the mediation server that the task has been executed,
- wherein the mediation server is located remotely from the project server,
- wherein each of the terminals can choose whether or not to participate in the project managed by the project server,
- wherein the mediation server does not mediate transmission and reception of data or execution result of the tasks, and
- wherein the project server sends tasks directly to the terminals that choose to participate in the project managed by the project server without passing the tasks through the mediation server.

* * * * *